A. BRUBAKER.
SPRING WHEEL.
APPLICATION FILED SEPT. 8, 1913.
1,125,955.
Patented Jan. 26, 1915.
2 SHEETS—SHEET 2.
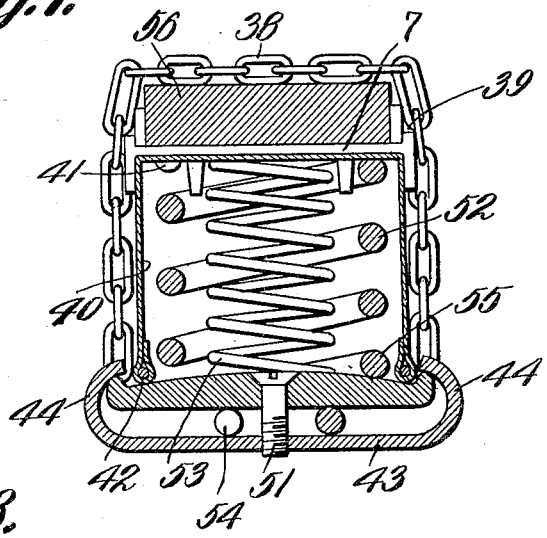
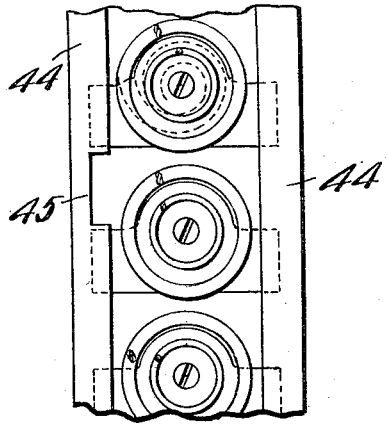
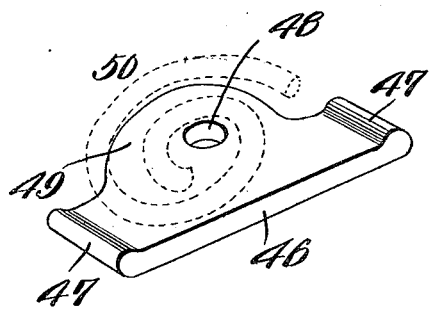
Witnesses
Andrew Brubaker,
Inventor
by C. A. Snow & Co.
Attorneys

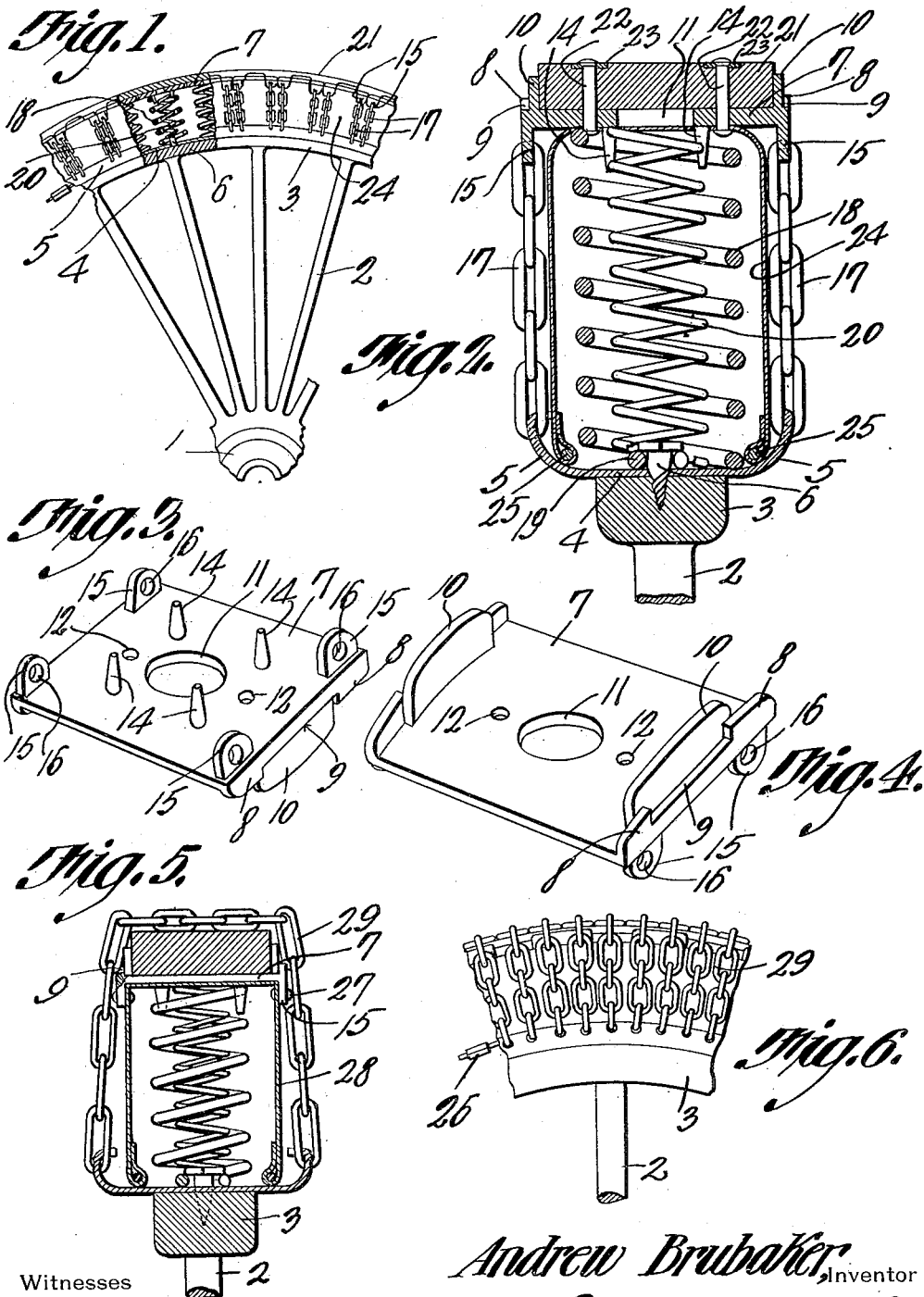

UNITED STATES PATENT OFFICE.

ANDREW BRUBAKER, OF ASHLAND, OHIO.

SPRING-WHEEL.

1,125,955.  Specification of Letters Patent. Patented Jan. 26, 1915.

Application filed September 8, 1913. Serial No. 788,707.

*To all whom it may concern:*

Be it known that I, ANDREW BRUBAKER, a citizen of the United States, residing at Ashland, in the county of Ashland and State of Ohio, have invented a new and useful Spring-Wheel, of which the following is a specification.

The device forming the subject matter of this application is a tire, and the invention aims, primarily to provide a device of this type in which the pneumatic elements heretofore resorted to are replaced by springs.

One object of the invention is to provide novel means for connecting the tire with the rim.

Another object of the invention is to provide novel means for assembling the cover operatively with the tread portion of the structure.

The invention aims to provide a supporting plate of novel form, and to provide novel means for operatively assembling the same with the springs.

The invention aims to improve generally and to enhance the utility of, devices of that type to which the present invention appertains.

With the above and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed without departing from the spirit of the invention.

In the drawing: Figure 1 shows in longitudinal section, a portion of a tire constructed in accordance with the present invention; Fig. 2 is a transverse section of the structure shown in Fig. 1; Fig. 3 is a perspective of one of the supporting plates, the same being inverted; Fig. 4 is a perspective of the supporting plate in its normal position; Fig. 5 is a transverse section showing a modified form of the invention; Fig. 6 is a fragmental side elevation of the structure shown in Fig. 5; Fig. 7 is a transverse section showing a modified form of the invention; Fig. 8 is an elevation of the rim and the springs as employed in Fig. 7; Fig. 9 is a perspective of one of the rim plates.

In the accompanying drawing, the numeral 1 denotes the hub and the numeral 2 denotes the spokes, the same supporting the felly 3. The felly 3 is circumscribed by a rim 4 having flanges 5. The rim 4 may be secured to the felly 3 by means of lag screws 6 or in any other suitable manner.

The invention further includes a plurality of supporting plates 7 disposed circumferentially of the rim 4 and spaced therefrom. Each supporting plate is provided along its longitudinal edges with outer flanges 8 having notches 9. Located inside of the outer flanges 8 are inner flanges 10 which extend across the notches 9. The plate 7 may be provided with a central opening 11, and upon opposite sides of the opening 11 are disposed openings 12. Projecting from the plate 7 are a plurality of prongs 14, and of these prongs there may be any number. Projecting from the plate 7 adjacent its corners and extended in a direction opposite to that assumed by the flanges 7 and 8 are ears 15 having openings 16. Flexible elements, preferably taking the form of chains 17 are connected with the rim 4, there being, in the present instance, four chains to each of the supporting plates 7, the outer links of the chains 17 being engaged in the openings 16 in the ears 15.

A resilient structure is interposed between each plate 7 and the rim 4. This resilient structure may be of any desired form. In the present instance, the same is shown as comprising an outer spring 18 having an eye 19 which is engaged by the lag screw 6, the prongs 14 serving to receive one end of each spring 18. If desired, another, smaller spring, indicated at 20 may be disposed within the spring 18, and within the prongs 14. It is to be understood that any use of the spring 20 is optional.

A yieldable tire 21 of any desired form surrounds all of the plates 7 and is held against lateral movement by the flanges 10. The tire 21 may be secured to each of the plates 7 by means of attaching elements 22 passing through the openings 12. If desired, reinforcing bands 23 may be countersunk into the periphery of the tire 21 to receive the ends of the attaching elements 22.

The invention further includes a flexible cover or dust guard 24, of arched shape, the cover or dust guard being fashioned from canvas, leather or any other flexible material. The cover 24 lies between the springs 18 and the chains 17 and is held on the plate 7 by means of the attaching elements 22. The longitudinal edges of the cover 24 carry rings 25, provided with suitable tightening means 26 of any desired form, as indicated in Fig. 6.

In Figs. 5 and 6, a slight modification of the invention has bee nshown. In this form of the invention the chains 29 extend in a continuous length transversely of the structure, the ends of the chains being secured to the rim as before. The cover 28 may be secured by means of attaching elements 27, to the ears 15 of the plates 7.

The device herein disclosed, although of few parts and simple in construction will be thoroughly efficient for the ends in view. The tire will be supported resiliently and will yield to a sufficient extent to render unnecessary, pneumatic elements or other structures of a like type which are subject to puncture and deterioration.

In that form of the invention which is disclosed in Fig. 5, the continuous chain 29 which extends transversely of the tire is engaged in the notches 9 of the supporting plate 7.

As shown in Figs. 7, 8 and 9, the invention comprises supporting plates 7 of the form hereinbefore described, the functions of the constituent elements of the plates 7 being obvious when Fig. 7 is compared with Fig. 5. The chains 38 are engaged in the notches of the outer flanges, as explained in connection with Fig. 5, and as shown at 39 in Fig. 7, the chains extending around the tire 56. The arched guard 40 is held in place by the securing elements 41 or if desired as shown at 27 in Fig. 5 and the tightening rings for the guard are provided as shown at 42.

The rim is shown at 43 and is provided with overhanging flanges 44, one of which is provided with a notch 45. Rim plates 46 are provided, the same having longitudinal ribs 47 at their ends. Each rim plate 46 is provided with a hole 48 and includes a lateral extension 49, the edge of which is curved as indicated at 50. One end of each rim plate 46 is placed beneath that flange 44 which has no notch, the other end of the rim plate being passed through the notch 45. Then, the rim plates are slid circumferentially, beneath the flanges 44, until the rim plates are in the desired positions, whereupon, the rim plates are secured to the rim 43 by means of screws 51. The outer spring is indicated at 52 and the inner spring is indicated at 53. The outer spring surrounds the prongs on the plate 7 and the inner spring lies within the prongs. The outer spring 52 terminates in an eye 54, bound between the rim plate 46 and the rim 43, the eye surrounding the screw 51 and one convolution 55 of the outer spring 52 which rests immediately on the rim plate 46 extends along and bears upon the curved edge 50 of the extension 49 of the rim plate 46, and thus the spring is held securely in position. The tire 56 is held in place by the chains 38.

In that form of the invention under discussion, the inner spring 53 and the guard 40 may be omitted if desired. It will be understood also, that the rim plate 46 and the rim 43 may be used when the chains 17 and the supporting plates 7 are positioned as shown in Fig. 2.

Having thus described the invention, what is claimed is:—

1. In a device of the class described, a rim having flanges, one of which is provided with a notch; a rim plate adapted to be inserted through the notch and be slid circumferentially of the rim beneath the flanges, the rim plate having a lateral extension; a helical spring having an inner convolution bound between the rim and the rim plate and engaged by the edge of the extension; and a tire supported by the spring.

2. As an article of manufacture in use for the making of a spring tire, a supporting plate provided along its longitudinal edges with outer flanges, each of which flanges is provided with a notch in its edge, the plate being provided with inner flanges which extend across the notches and project beyond the edges of the outer flanges, the plate being provided upon one face with a spring holding projection, and being provided near its longitudinal edges with projecting ears which extend in a direction opposite to the flanges.

In testimony that I claim the foregoing as my own, I have hereto affixed my signature in the presence of two witnesses.

ANDREW BRUBAKER.

Witnesses:
H. B. VANASDALL,
H. J. RAUBENOLT.

Copies of this patent may be obtained for five cents each, by addressing the "Commissioner of Patents, Washington, D. C."